United States Patent
Toci et al.

(10) Patent No.: US 9,505,086 B2
(45) Date of Patent: Nov. 29, 2016

(54) METHOD FOR DETECTING FLAWS IN THE PROCESS FOR THE CONTINUOUS LASER WELDING OF METALLIC PORTIONS

(75) Inventors: Guido Toci, Rome (IT); Roberto Pini, Rome (IT)

(73) Assignee: CONSIGLIO NAZIONALE DELLE RICERCHE, Rome (IT)

( * ) Notice: Subject to any disclaimer, the term of this patent is extended or adjusted under 35 U.S.C. 154(b) by 755 days.

(21) Appl. No.: 13/819,255

(22) PCT Filed: Aug. 29, 2011

(86) PCT No.: PCT/IB2011/053767
§ 371 (c)(1),
(2), (4) Date: Aug. 7, 2013

(87) PCT Pub. No.: WO2012/029010
PCT Pub. Date: Mar. 8, 2012

(65) Prior Publication Data
US 2014/0149075 A1    May 29, 2014

(30) Foreign Application Priority Data
Aug. 31, 2010  (IT) .............................. RM2010A0461

(51) Int. Cl.
B23K 26/03    (2006.01)
B23K 31/12    (2006.01)

(52) U.S. Cl.
CPC ........... B23K 31/125 (2013.01); B23K 26/032 (2013.01)

(58) Field of Classification Search
CPC combination set(s) only.
See application file for complete search history.

(56) References Cited

U.S. PATENT DOCUMENTS 5,674,415 A    10/1997  Leong et al.
6,060,685 A *  5/2000  Chou et al. ............. 219/121.83
(Continued)

FOREIGN PATENT DOCUMENTS

DE    4313287    * 10/1994  ............ B23K 26/03
EP    1987910 A1    11/2008
JP    2002-79386    * 3/2002

OTHER PUBLICATIONS

International Preliminary Report on Patentability for PCT/IB2011/053767, issued on Mar. 2013.*
(Continued)

*Primary Examiner* — Huan Tran
(74) *Attorney, Agent, or Firm* — Volpe and Koenig, P.C.

(57) ABSTRACT

In a method for detecting flaws in continuous laser welding processes, including a sensor measures plasma emission spectrum in a range of wavelengths between $\lambda_{max}$ and $\lambda_{min}$ in N channels, each measuring radiation strength emitted in the band centered at wavelength $\lambda_i$ ($1 \leq i \leq N$) and width $\Delta\lambda_i$. Deviation detection is based upon calculating intensity relationships of signals measured at specific wavelengths and in comparison with pre-determined threshold values. A calibration phase ensures a series of K weldings is performed, under optimized conditions, for each a number J of spectra $O_{J,K}$, is acquired, each one corresponding to a vector of N intensity values at wavelengths $\lambda_i$, $1 \leq i \leq N$, and a series of weldings K' is then performed, (K'≠K), a single welding parameter A is altered by a known quantity, for each welding being acquired a sequence of J' spectra $A_{J',K'}$, (J'≠J), which are stored.

12 Claims, 5 Drawing Sheets

(56) References Cited

U.S. PATENT DOCUMENTS

| | | |
|---|---|---|
| 7,129,438 B2 | 10/2006 | Bates et al. |
| 2004/0032597 A1 | 2/2004 | Esmiller |
| 2010/0133248 A1 | 6/2010 | Pinon et al. |

OTHER PUBLICATIONS

International Search Report for PCT/IB2011/053767 issued on Feb. 2012.*
Lewis et al. "Plasma Monitoring of Laser Beam Welds", Welding Research Supplement, pp. 49-54, Feb. 1985.*
Sibillano et al., "A Real-Time Spectroscopic Sensor for Monitoring Laser Welding Processes", Sensors May 7, 2009.*
Mirapeix et al, "Use of the Plasma Spectrum RMS Signal for Arc-Welding Diagnostics", Sensors Jul. 3, 2009.*
Sforza et al., "On-line opticall monitoring system for arc welding", NDT & E International, 35 (2002), 37-43.*
Mirapeix et al., "Real-time arc welding defect detection technique by means of plasma spectrum optical analysis", NDT & E International 39 (2006), 356-360.*
Marek Stanislaw Weglowski, "Monitoring of Arc Welding Process Based on Arc Light Emission", Intech 2012, Chapter 13, pp. 305-332. http://cdn.intechopen.com/pdfs-wm/41013.pdf.*
Kang et al., "Real Time Inspection Method for Laser Welding Process", IEEEXplore 2012, 12th International Conference on Contro.*

* cited by examiner

METHOD FOR DETECTING FLAWS IN THE PROCESS FOR THE CONTINUOUS LASER WELDING OF METALLIC PORTIONS

BACKGROUND OF THE INVENTION

1. Field of the Invention

The present invention relates in general to the field of monitoring techniques for controlling the processes for welding metals by means of laser, applicable for example to the process for welding pre-finished elements, such as moulded elements, sheets, elements obtained by melting.

More in particular, the present invention relates to a method for analyzing data generated by a spectroscopic sensor, that is an apparatus able to measure simultaneously the intensity of an optical radiation in several wavelength bands (spectrum).

In the present invention, this type of sensor is used to measure with said mode the optical emission (emission spectrum) of the plasma generated in the welding area. Such measurement is performed repeatedly during the phase of the welding process which ones wants to monitor.

The analysis method, by means of examining in real time the emission spectra acquired by said sensor, allows detecting the deviation of the physical parameters of the welding process from an optimum-considered region of values, deviation of parameters which, if it is not controlled and correct, can produce flaws in the resulting welding. The so-obtained piece of information can be used as entrance of a retroaction system of the welding apparatus, which intervenes in real time on the physical parameters of the welding process, in order to correct the anomaly. An integrating portion of this method for analyzing data is constituted by a calibration preliminary phase, wherein the measurements of said sensor are acquired corresponding to several welding processes performed both under optimized conditions, both under conditions wherein one or more parameters of the welding process are altered in a controlled way.

The spectra produced by the sensor during these tests are processed with the procedure better described hereinafter, in order to detect the correlations between the specifically introduced variation of the physical parameter and the features of the resulting emission spectrum. These sets of measurements constitute a library with which the measurements obtained under operating conditions will be compared, in order to detect deviations of the parameters from the optimum values thereof, which can take place during the welding process.

2. Description of the Prior Art

The assembly by means of laser welding of half-finished metallic elements is widely used in several industrial fields. In particular, in the field of the automobile production, the laser welding is used to join half-finished portions, obtained for example by moulding, which compose frame members or other chassis members (for example doors).

Among the most widespread laser technologies, currently there are the continuous laser welding implemented with carbon dioxide laser ($CO_2$, emission at the wavelength of 10.6 micrometers) or solid state laser with Neodymium crystal or glass (Nd:YAG or Nd:Glass, with emission around 1.06 micrometers) with continuous operation, and the spot welding implemented with laser with pulsed operation.

As far as the continuous laser welding is concerned, such technique is industrially used by several producers by means of automatic or robotized systems, thus without the operator direct intervention.

The quality control aimed at reducing flaws in such welding processes constitutes a problem of considerable importance, particularly relating to the vehicle portions with passive safety function (for examples structures with controlled deformability in the chassis front portion) wherein welding flaws, which might compromise the resistance thereof in case of collision, are not admitted.

The quality control often is post-performed, that is at the end of the production process, with methods such as the visual inspection or other not destructive diagnostic methods (for example radiographic methods, ultrasound survey) or destructive methods (resistance tests, welding junction sections) on a limited number of samples. This quality control phase is very time-consuming, with consequent impact on the production costs.

Furthermore, in case flaws are found, it is not always possible obtaining indications about the causes which have brought about the flaw, or the remedies to be adopted to eliminate the flaw itself.

Another approach to the quality control in the laser welding is constituted by the line control, during the welding process, by means of proper sensors, for example of optical or thermal type.

With these sensor techniques it is possible monitoring the welding process and detect the deviation of the process conditions with respect to the optimum values, in order to detect and possibly correct in real time the flaw occurrence.

In order to explain the objects and the features of the present invention, it is better to provide a brief description of the process for the continuous laser welding of metallic sheets, as well as the process for forming plasma and for luminous emission generated by such plasma.

The autogenous welding process is obtained by means of the localized melting of the metal constituting the members to be joined. In case of continuous laser welding, the localized melting is obtained by focalizing a laser beam with adequate intensity on the metal surface.

The absorption by the metal of a laser beam power fraction determines an increase in the material temperature which reaches first of all the melting point and then the vaporization point of the metal. The so-generated vapour pressure expels the metal melt by the focal area along the beam axis, by generating a thin channel, said keyhole.

The keyhole opening allows the intensity supplied by the laser beams to deeply penetrate in the metallic piece, until reaching the underneath piece to be joined by means of the welding process.

The vaporized metal is further heated by the incident laser beam, until reaching a plasma state at high temperature, wherein there is the coexistence of:
  atoms of the metal and gas of the surrounding atmosphere, under electrically neutral conditions, but under excited energy states;
  atoms of the metal and gas of the surrounding atmosphere, under ionized conditions, and in excited energy states of ionized atom;
  free electrons.

Due to the high density of free electrons, the so-generated plasma results to be optically opaque in the region of the infrared wavelength, and only partially transmitting in the spectral region of visible and near infrared. Such property influences the power transferring process from the laser beam to the material to be welded: when the plasma is developed, the laser beam power absorption does not take place at the level of the metal surface, but due to the plasma, which in turn transfers heat to the surrounding metal (then one speaks of plasma-mediated process).

This effect is important in particular when the welding is performed with laser with emission in the spectral region of the infrared medium, such as for example the $CO_2$ laser.

The radiative de-exciting from excited energy levels towards levels of lower energy of the atoms and ions composing the plasma causes the optical radiation emission at specific wavelengths depending from the features of the atom (or the ion) which de-excites and from the pair of energy levels involved in the transition. The radiation intensity $I(\lambda)$ is determined by the atomic transitions taking place in the metal, but even by outer factors such as in particular:

plasma local temperature (line broadening due to the Doppler effect);
local pressure (line broadening due to collisions);
electronic density (broadening due to Stark effect), furthermore, the presence of free electrons determines the shifting (again due to Stark effect) of the wavelengths of the involved energy transitions.

The whole plasma emission is constituted by the overlapping of the emissions generated by various ionic atomic species, each one thereof contributes with the emission linked to various transitions; furthermore the intensity and shape of each emission line depends upon the plasma local conditions (temperature, density, pressure, electronic density).

An example of the course of the plasma emission whole intensity in terms of the wavelength (hereinafter defined emission spectrum) is shown in FIG. 1.

It results then that the emission spectrum whole course is influenced by several elements concurring to the welding process, for example:

involved chemical species, belonging to the processed metals (in the mass or in possible coatings), shielding gases, possible contaminants, possible intrusion of environment air;
plasma temperature, ionization level of the involved species; and
electronic density in the plasma.

These elements and physical quantities influence the process of transferring power from laser beam and the plasma and from the plasma to the pieces to be welded. Furthermore, they are influenced by other factors such as variations in the composition or in the thickness of the materials and variations in the process geometry, for example presence of gaps among the materials to be welded.

Although basically it is possible determining these physical quantities by means of a suitable analysis of the emission spectrum, with the current knowledge it is not possible establishing in advance a link between the plasma features and the welding quality, due to the complexity of the involved interaction processes.

Hereinafter a survey method of phenomenological type is described, therewith in the emission spectra differences are detected which are significant for detecting flaws, that is the cases wherein the welding is implemented in optimum way and the cases wherein the welding is performed under conditions producing a flaw.

As to the diagnostics performed by means of the acquisition of the plasma emission spectrum with a sensor of spectroscopic type, hereinafter some documents belonging to the here discussed state of art are evidenced.

German patent Nr. DE 4313287 described a method for analyzing the spectrum based upon the calculation of the intensity ratio between ion emission lines of a same element at different ionization states, in order to obtain information about the plasma ionization state, to be correlated to the welding penetration degree. Furthermore, in such method the ionization state provides indications about the result of the welding process as a whole, without specific indications about possible alterations of the parameters.

European patent Nr. 911,109 describes the use of a spectroscopic survey method aimed at detecting the plasma-emitting spectral bands useful for monitoring; such information is used to select one or more pass-band filters coupled to optical sensors; the process monitoring is performed by measuring the intensity of the light signal in the bands determined by the pass-band filters, and by verifying that in the process such intensity keeps within determined thresholds; such thresholds are established based upon the values which the signal assumes when weldings are performed with a result considered to be acceptable.

Furthermore, in this document it is claimed that the temporally mediated value of the signal coming from the above-mentioned sensors is correlated to one or more of the following parameters: translation speed of the piece to be welded; laser power; laser focus position; object surface contamination; shielding gas flow; object physical deformation.

U.S. Pat. No. 7,129,438 described instead the use of a methodology wherein the output signal of a general (ex. optical, image or acoustic) monitoring sensor is created to monitor a process parameter, and the output of such sensor (in case processed with a general mathematic algorithm able to provide a univocal result) is correlated to the welding quality by means of direct comparison with the weldings obtained by varying a single parameter of the welding itself.

SUMMARY OF THE INVENTION

Generally, the object of the present invention is to provide an analysis method of the data coming from an optical sensor of spectroscopic type, that is a sensor able to measure simultaneously the intensity of an optical radiation in various wavelength bands, in order to detect in real time the flaw occurrence in the welding itself.

More in detail, the proposed method analyzes the plasma emission spectrum coming from the welding, repeatedly acquired by means of such spectroscopic sensor. The analysis procedure consists in evaluating the signal intensity ratio of each spectrum at specific wavelengths, and in comparing such ratio with predetermined threshold values.

The pairs of wavelengths to be used and the threshold values to be used in the comparison are determined in a proper calibration phase of the data acquisition system. This calibration phase constitutes integrating portion of said data analysis method.

In such calibration phase the measurements of said sensor are acquired, corresponding to several welding processes performed both under optimized conditions, both under conditions wherein one or more parameters of the welding process are altered in a controlled way.

The systematic analysis of such spectra, according to the methods described hereinafter, allows determining the wavelength pairs the ratios thereof are indicative of the occurrence of a given anomaly type, and the threshold values therewith such ratios are to be compared.

The result of such data analysis method allows detecting then deviations of the plasma emission features with respect to reference values, correlated with the flaw occurrence in the welding.

Furthermore, a particular object of the present invention is to provide a data analysis method which, apart from detecting the occurrence of anomaly in the welding process, is also able to recognize which process parameter(s) has (have) been subjected to deviation from the optimum operative conditions, by causing the anomaly itself.

Such objects are achieved by a method for detecting flaws in the process for the continuous laser welding of metallic portions as defined in the enclosed claim 1.

Additional objects are achieved by the method as defined by the depending claims.

With respect to the state of art, the proposed method allows obtaining the following improvements:

the proposed method for searching for pairs of optimum wavelengths is wholly independent from the type and features of the welded materials and the welding system, and thus it can be applied in a wide variety of cases;

the used calculation mode is relatively quick and little expensive in terms of performances of the data processing system, and thus it allows processing the signals in real time;

the proposed method allows obtaining in real time information about the parameter the alteration thereof has produced the deviation from the optimum welding condition;

this latter feature allows using the monitoring system to apply a retroaction in real time to the welding system, in order to correct the altered parameters;

the method provides information based upon the analysis of a single spectrum, thus allowing to maximize the reply speed and the spatial resolution of the monitoring system.

The present invention provides a search method used to detect the wavelength pairs which provide significant information about the alteration of the welding process parameters.

It is systematic and it is not based upon determining plasma specific physical parameters such as the ionization degree. Furthermore, the here presented algorithm provides information about the deviation of the parameters of the welding process with respect to the optimum situation, in case by anticipating the flaw formation such as insufficient penetration.

In the method according to the invention the output of a spectroscopic sensor with high resolution and the signal intensity ratios with wavelength pairs, and not the absolute intensities, are used, in order to make the monitoring system stronger with respect to fluctuations with signal complex intensity, in the short term (ex. turbulences) and in the medium term (ex. progressive misalignment or dirtying of the sensor collect optics).

With respect to the state of art wherein, for monitoring purposes, the signals provided by optical sensors with pass-band filters are used, according to the invention the high resolution spectrum is used obtained by a multi-channel spectrometer. Furthermore, in the method according to the present invention the information obtained by a single spectrum, and not the time average of spectra along the whole welding process, is used, in order to optimize the time resolution of the data analysis algorithm. In this way the information provided by the algorithm can be used in real time to bring corrections in real time.

At last, in the method according to the present invention, the variations of the signal coming from the sensor are correlated to the variations of the welding process parameters, thus providing information about the occurrence of variations of the process parameters, preliminary to the occurrence of the flaw itself. Therefore, the present method provides information about the parameter to be corrected in the welding system and in advance with respect to the occurrence of the flaw itself.

BRIEF DESCRIPTION OF THE DRAWINGS

The features and the advantages of the proposed data analysis method will result more clearly from the following description of an embodiment by way of example and not with limitative purpose by referring to the drawings and to the enclosed schemes wherein.

DETAILED DESCRIPTION OF THE INVENTION

Figure 2:
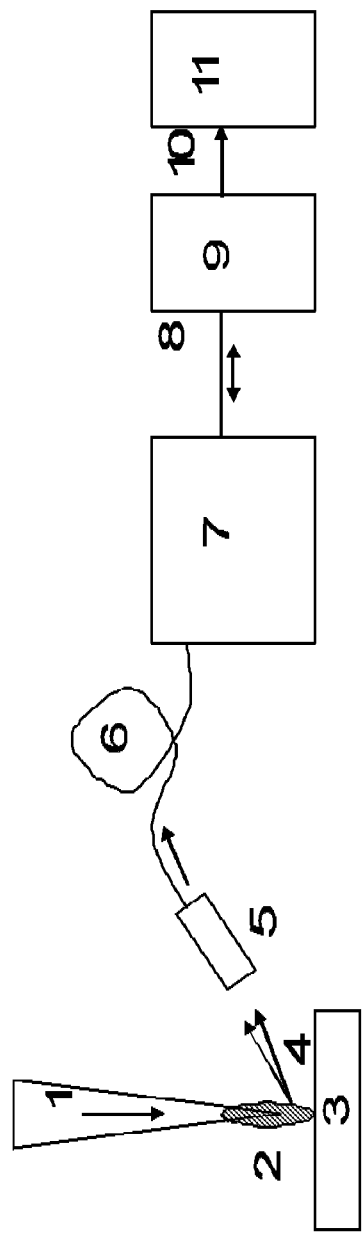
FIG. 2 shows schematically a possible arrangement for the monitoring sensor, which generates the data the analysis thereof constitutes the object of the present invention, and the connection thereof to the data processing apparatus and to the system for controlling the welding apparatus.

By referring to FIG. 2, a data acquiring system for the spectroscopic monitoring comprises a welding laser beam 1, a plasma plume 2, a piece under processing 3, a plasma emission 4; a collecting optics 5; a fiber optic or guide for the transportation of the luminous radiation 6, a spectroscopic sensor 7, a connection to the processor for controlling the spectroscopic sensor 8, for the data transfer, a processor 9 for the sensor control and the data processing, a communication connection 10 with the control system of the welding apparatus and at last a control system 11 of the welding apparatus, for adjusting the process parameters.

The spectroscopic sensor 8 can be constituted, by way of example and not with limitative purpose, by a spectrometer of the type called with diffraction grating with array detector such as for example a CCD or CMOS camera; or by a spectrometer of the type called with dispersive prism with array detector such as for example a CCD or CMOS camera; or even by a series of band-pass filters centred at different wavelengths with a radiation power measurer associated to each filter; by a sensor constituted by an array detector of CCD or CMOS type in front thereof a pass-band filter is placed with variable transmission spectrum with respect the position on the filter itself; at last, a spectrometer of the type called with Fourier transform with beam division.

Figure 1:
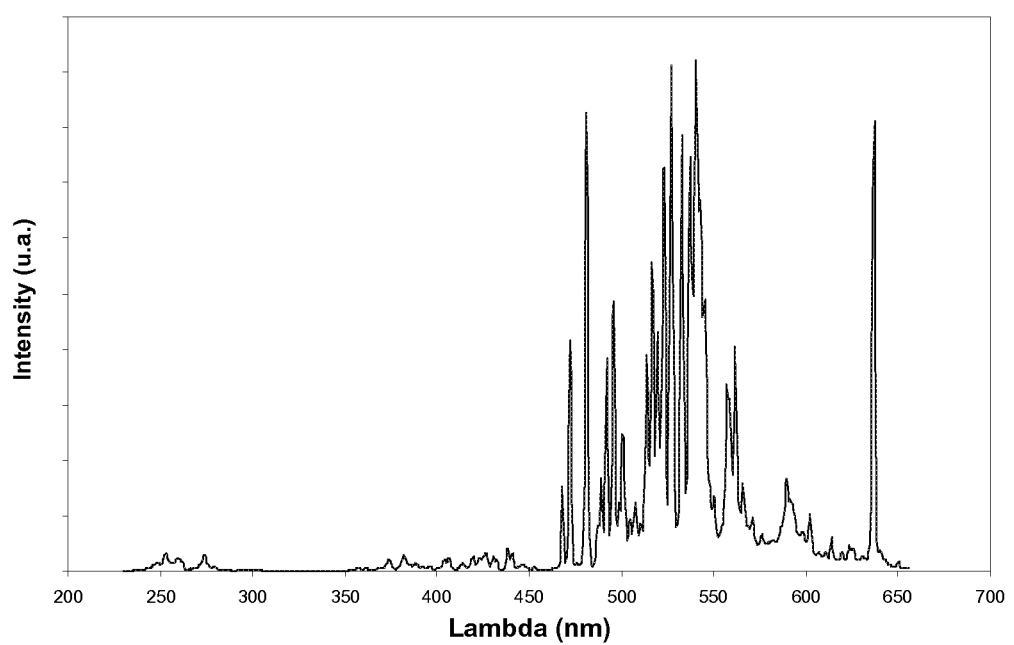
FIG. 1 shows by way of example an emission spectrum acquired during the continuous laser welding with $CO_2$ laser of galvanized steel sheets.

By referring to the figures and in particular to FIG. 2, it is assumed that the spectroscopic sensor 7 measures the plasma emission spectrum 2 (FIG. 1) in a range of wavelengths comprised between $\lambda_{max}$ and $\lambda_{min}$.

Such interval is preliminarily divided into N bands, hereinafter defined channels, normally but not necessarily with equal width so that every channel measures the power of radiation emitted in the band centred at the wavelength $\lambda_i$ ($1 \leq i \leq N$) and with width $\Delta\lambda_i$.

During the welding process of the piece 3 the sensor acquires repeatedly the spectrum of the optical signal, collected by the objective lens 5 and conveyed to the sensor by means of a suitable optical system or wave guide 6 with optical fibres.

The spectrum acquisition takes place at regular time intervals $\Delta T$. Immediately after the acquisition, each spectrum is transferred to the processor 9 by means of the connection 8 for storing or analysing data, and the information transfer to a control system of the laser apparatus for the retroaction.

The spectrum to be analysed coming from the sensor 8 is subjected in advance to pre-processing procedures to calculate again or define again the number and the spectral width of the bands, to modify the signal level in each band, to improve the signal-noise ratio, such as (as example but not in exhaustive way): subtraction of a background spectrum; transformation of the signal intensity level of each band by means of a defined mathematical relation; interpolation at different wavelengths; re-sampling at different wavelengths; average or sum between channels with contiguous wavelengths; convolution with a spectral filter function; average, sum or convolution with a time filter function of two or more spectra acquired at different periods of time.

In the following description it is assumed that in the spectral range covered by the sensor ($\lambda_{max}$ and $\lambda_{min}$) the number N, the position $\lambda_i$ and the width of the single spectral band (channels) $\Delta\lambda_i$, and the signals in the single bands are those really resulting after such pre-processing operations. Such pre-processing operations can take place both at the level of the processor (9) and at the level of the electronics for controlling and managing the sensor (7).

By way of example and with not restrictive purpose, the values of the parameters can be the following ones:

1100 nm<$\lambda_{max}$<700 nm
300 nm<$\lambda_{min}$<200 nm
0.01 nm<$\Delta\lambda$<3 nm
500<N<4000
1 ms<$\Delta T$<100 ms As it will be better described hereinafter, the detection of the deviation of the process parameters from the optimum conditions is based upon the calculation, for each acquired spectrum, of the intensity ratios of the signal measured at some specific wavelengths, and in the comparison of such ratios with the predefined threshold values.

The pairs of wavelengths and the threshold value can be correlated to the parameter which has suffered the alteration from the optimum value, to the deviation entity, and they must be determined and stored by means of a preliminary phase for calibrating the algorithm and the acquisition system, which results to be integrating portion of the present method.

A) Calibration Phase

Figure 5:
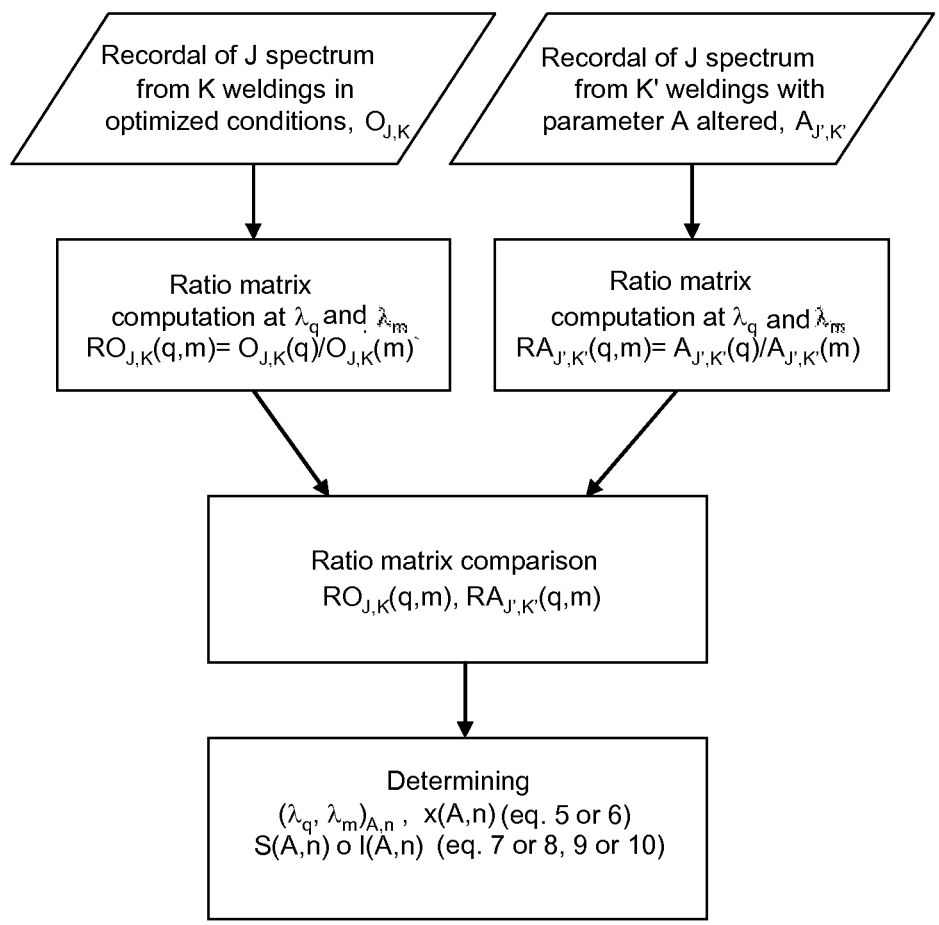
FIG. 5 shows the algorithm flow chart during the calibration phase for detecting the pairs of wavelengths and the threshold values of the ratios for detecting a given anomaly A.

In the phase for calibrating the data analysis algorithm, which is illustrated in the flow chart of FIG. 5, a series of K weldings in a higher number than some units is performed, under optimized conditions with respect to the process parameters, for each one thereof a J number of spectra is acquired.

Such spectra $O_{J,K}$, each one corresponding to a vector of N intensity values at the wavelengths $\lambda_i$, $1 \leq i \leq N$, are then stored in the processor.

Then, a series of K' weldings is performed, wherein K' is not necessarily equal to K, wherein a single parameter A is altered by a known quantity. Such parameter as example can be represented by:

the laser emission power, with an alteration towards values higher or lower than the optimum value;
the piece translation speed, with an alteration towards values higher or lower than the optimum value;
the focus distance of the laser beam with respect to the piece surface with an alteration towards values higher or lower than the optimum value;
the separation (gap) between two sheets to be welded;
the assistance gas flow.

For each one of the weldings performed under the not optimized condition under examination, a sequence of J' spectra is acquired, with J' not necessarily equal to J. Such spectra $A_{J',K'}$ are then stored.

For each one of the spectra acquired respectively under optimized conditions $O_{J,K}$, and not optimized conditions $A_{J',K'}$, the matrixes of the ratios $RO_{J,K}(q,m)$ and $RA_{J,K}(q,m)$ are then calculated according to the relation $$RO_{J,K}(q,m) = O_{J,K}(q)/O_{J,K}(m) \tag{2}$$

$$RA_{J,K}(q,m) = A_{J,K}(q)/A_{J,K}(m) \tag{2a}$$

which correspond to the ratio of the intensities at the wavelengths $\lambda_q$ and $\lambda_m$. Such matrixes have then size of N×N elements.

In order to detect the pairs of indexes q and m wherein the intensity ratios of the spectra between the weldings under optimized conditions and the weldings under anomalous conditions for each pair of indexes q, m (with $1<q<N$ and $1<m<N$) takes place if for all spectra of the series $O_{J,K}$ and $A_{J',K'}$ the relation $$RA_{J',K'}(q,m) > RO_{J,K}(q,m) \tag{3}$$

is verified
or if the relation $$RA_{J',K'}(q,m) < RO_{J,K}(q,m) \tag{4}$$

is verified.

Therefore, there are the following cases:
1) for the pairs of indexes (q,m) satisfying the relation (3), the condition is verified that the ratio between the signals at the wavelengths $\lambda_q$ and $\lambda_m$ for faulty weldings is always higher than the same ratio in case of optimum weldings;
2) analogously, for the pairs of indexes (q,m) satisfying the relation (4), the condition is verified that the ratio between the signals at the wavelengths $\lambda_q$ and $\lambda_m$ for weldings under altered conditions is always lower than the same ratio in case of weldings performed under optimum conditions.

If the relation (3) or (4) is not verified for any pair of indexes, a weaker discrimination is detected by means of following statistical criterion is detected: one looks for the pairs of indexes (q,m) which for all spectra and for all sequences J, K and J', K' verify the relation $$P_{100-x}(RO_{J,K}(q,m)) \leq P_x(RA_{J',K'}(q,m)) \tag{5}$$

or the relation $$P_{100-x}(RA_{J',K'}(q,m)) \leq P_x(RO_{J,K}(q,m)) \tag{6}$$

wherein $P_x$ is the percentile at the probability level x (for example x=5%), $P_{100-x}$ is the percentile at the probability level 100-x (ex. 95% for x=5%).

For a given pair of indexes q, m the relation (5) is verified if the distribution of the values of $RO_{J,K}(q,m)$ falls for a fraction 100–x below a certain reference value (expressed by $P_{100-x}(RO_{J,K}(q,m))$, and the distribution of the values of $RA_{J',K'}(q,m)$ falls for a fraction not higher than x % below such reference value.

Analogously, the relation (6) is verified if for a given pair of indexes q, m the distribution of the values of $RA_{J',K'}(q,m)$ falls for a fraction 100–x % below a given reference value (expressed by $P_{100-x}(RA_{J',K'}(q,m))$, and the distribution of the values of $RO_{J,K}(q,m)$ falls for a fraction not higher than x % below such reference value.

The value of x % therefore the condition (5) or (6) are verified with the strict equality condition constitutes a figure of merit for the pair of wavelengths $\lambda_q$ and $\lambda_m$, as it designates the probability of discriminating between optimum or anomalous conditions by using the intensity ratio at the wavelengths $\lambda_q$ and $\lambda_m$, that is the lower is x %, the greater is the separation between the oscillation bands of the values. For x=0% the conditions (5) and (6) respectively coincide with the conditions (3) and (4).

Figure 3:
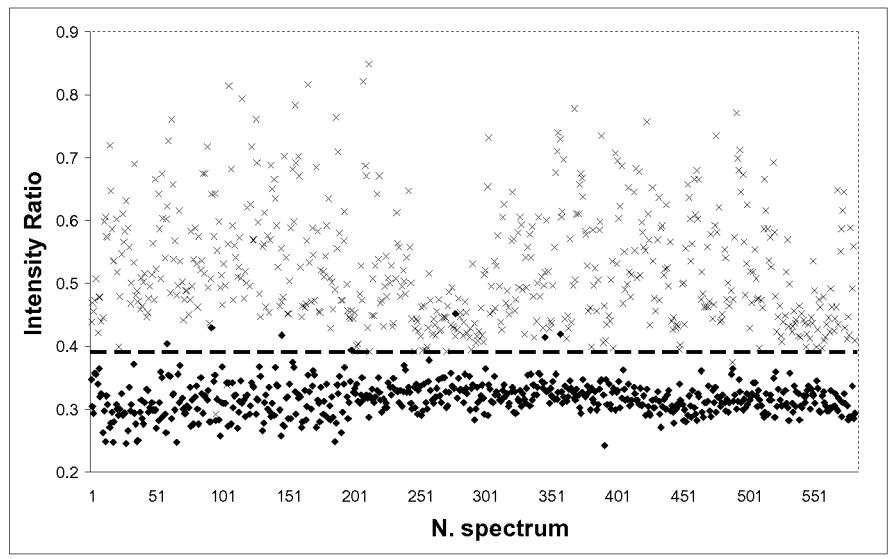
FIG. 3 shows the distribution of the values of the intensity ratio of the signal at two specific wavelengths, by comparing the case of welding under optimized conditions and with the case of flaws in welding due to a higher gap value than the optimum one.

This is shown by way of example in the graph of FIG. 3, wherein the course of the ratio of the signal intensities in the channels corresponding to the wavelengths of 497.06 nm and 561.79 nm is shown, wherein the bandwidth of the single channel is 0.6 nm. The anomaly introduced in the welding process corresponds to have used a gap of 0.5 mm, higher than the value considered optimum of 0.2 mm. The graph shows the course of such ratios under optimized conditions (symbols: solid rhombi) and not optimized conditions (symbols: X) for three weldings for each condition (K=K'=3), with 195 spectra acquired for each welding (J=J'=195), at a regular frequency of 25 spectra/sec. For such sequences of data the conditions (3) or (4) are not satisfied, but the condition (5) with x≥1.06% is satisfied.

Figure 4:
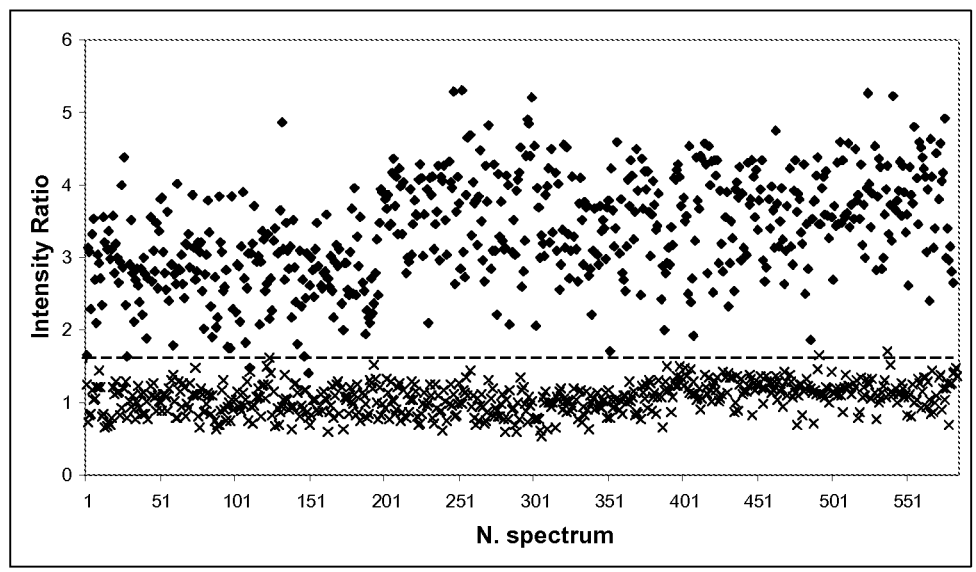
FIG. 4 shows the distribution of the values of the intensity ratio of the signal at two specific wavelengths, by comparing the case of welding under optimized conditions, by comparing the case of welding under optimized conditions with the case of flaws in welding due to a beam focused below the optimum position.

Another example is provided in the graph of FIG. 4, wherein the course of the of the ratio of the signal intensities in the channels corresponding to the wavelengths of 592.33 and 640.80 nm is shown, with bandwidth of the single channel still of 0.6 nm. The introduced anomaly corresponds to have placed the focus of the welding laser beam 3 mm below the optimum position. The graph shows the course of such ratios under optimized conditions (symbols: solid rhombi) and not optimized conditions (symbols: X) for three weldings for each condition (K=K'=3), with 194 spectra acquired for each welding (J=J'=194), at a regular frequency of 25 spectra/sec. For such sequences of data the conditions (3) or (4) are not satisfied, but the condition (6) with x≥0.34% is satisfied.

Based upon the above-described method, for at least some of the anomalous conditions A for performing the welding:
a series of n pairs of wavelengths $(\lambda_q, \lambda_m)_{A,n}$ verifying the condition (5) or the condition (6), with x smaller or equal to a given level $x_{min}$; and
a series of associated figures of merit (probability values) $x(A,n)$ therefore the condition (5) or (6) is verified with the equality sign,
are detected.

For the pairs of wavelengths verifying the relation (5) a series of higher threshold values $S(A,n)$ is determined so that:

$$S(A,n)=P_{100-x(A,n)}(RO_{J,K}(q,m)_{(A,n)})=P_{x(A,n)}(RA_{J',K'}(q,m)_{(A,n)}) \quad (7)$$

For the pairs of wavelengths verifying the relation (6) a series of lower threshold values $S(A,n)$ is determined so that:

$$I(A,n)=P_{100-x(A,n)}(RA_{J',K'}(q,m)_{(A,n)})=P_{x(A,n)}(RO_{J,K}(q,m)_{(A,n)}) \quad (8)$$

In case for the pair of indexes $(q,m)_{(A,n)}$ the conditions (3) or (4) are verified, the thresholds can be defined by using, instead of the equations (7) and (8), respectively the relations $$S(A,n)=[\min(RA_{J',K'}(q,m))+\max(RO_{J,K}(q,m))]/2 \quad (9)$$

$$I(A,n)=[\max(RA_{J',K'}(q,m))+\min(RO_{J,K}(q,m))]/2 \quad (10)$$

being max and min the maximum and minimum values of the respective series of ratios. In these two cases the value zero will be assigned to the associated figure of merit (probability value) $x(A,n)$.

B) Process Diagnostic Phase

In the diagnostic phase, the spectroscopic sensor acquires at regular time intervals the plasma emission spectrum during welding and it transfers it to the data analysis algorithm.

Figure 6:
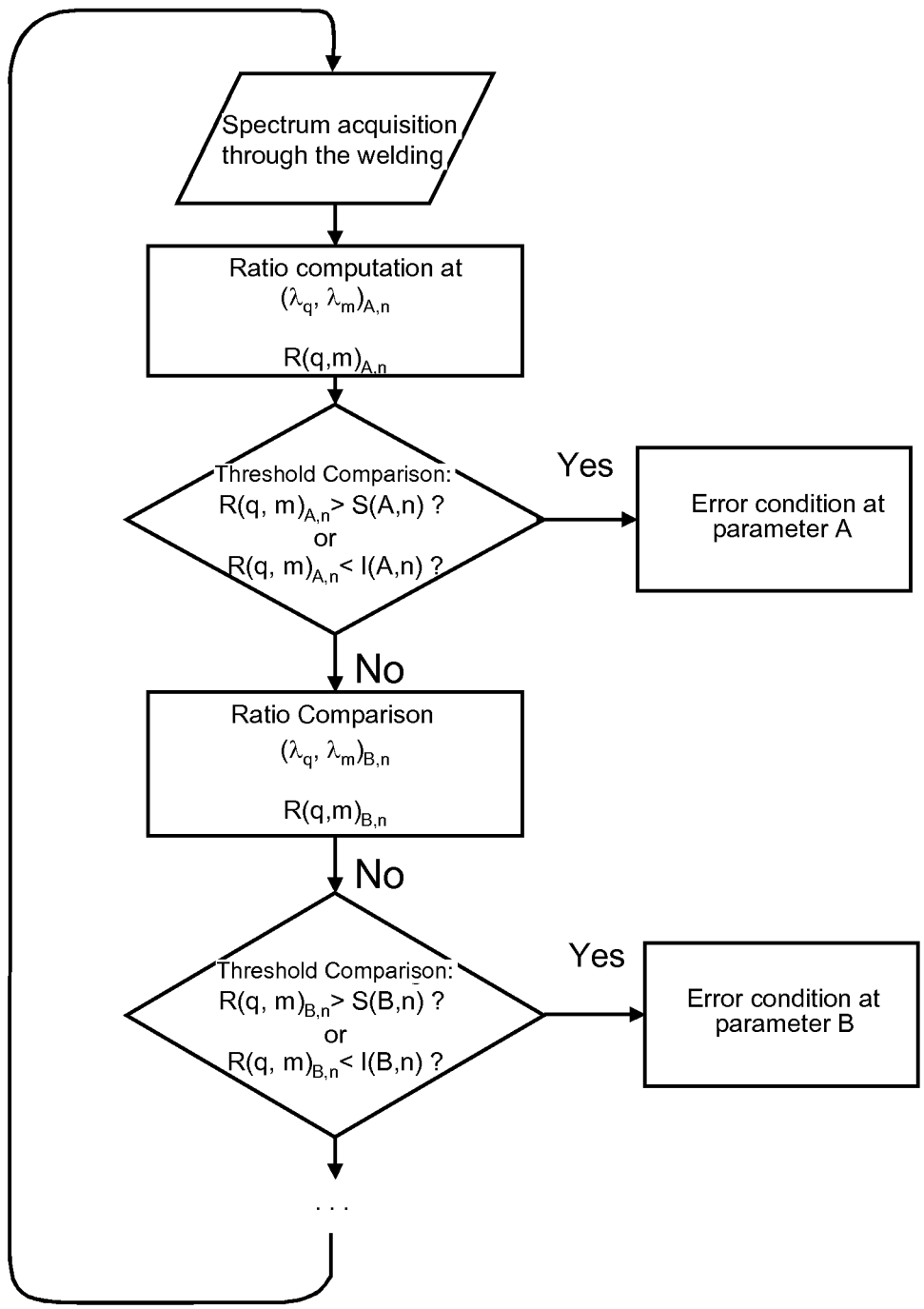
FIG. 6 shows the flow chart of the algorithm operation in the welding monitoring phase, to detect the occurrence of the anomalies of type A, B, . . . etc.

The so-acquired spectrum is analysed to detect the anomaly A according to the following procedure (FIG. 6):
For the pairs of wavelengths $(\lambda_q, \lambda_M)_{A,n}$ detected in the calibration phase, the corresponding ratios $R(q,m)_{A,n}$ are calculated;
each one of the so-calculated ratios is compared with the corresponding threshold $S(A,n)$ or with the threshold $I(A,n)$ to control if the condition $$R(q,m)_{A,n} > S(A,n) \quad (11)$$

or the condition $$R(q,m)_{A,n} < I(A,n) \quad (12)$$

has taken place.

The comparison is to be performed by using the relation (11) if the pair of indexes $(q,m)_{A,n}$ satisfies the relation (5) or (3) and the threshold $S(A,n)$ has been determined by using the corresponding relation (7) or (9); the comparison is to be performed by using the relation (12) if the pair of indexes $(q,m)_{A,n}$ has been detected by using the relation (6) or (4) and the threshold $I(A,n)$ has been determined by using the corresponding relation (8) or (10). The taking place of the condition (11) or the condition (12) shows that the level of $R(q,m)_{A,n}$ has entered the range of values corresponding to a condition of anomaly A.

The above-described procedure is performed for at least one of the pairs of channels $(q,m)_{A,n}$. Based upon how many and which pairs $(q,m)_{A,n}$, $(q',m')_{A,n'}$, $(q'',m'')_{A,n''}$, etc., verify the condition for passing the threshold (11) or (12), it is possible deciding if an anomaly has really occurred, which is the type among the experimented cases in the learning phase and in case using this piece of information for corrective actions.

The procedure is then repeated to detect the anomaly B, by calculating, for the pairs of channels $(q,m)_{B,n}$, the corresponding intensity ratios and by comparing them with the corresponding thresholds.

The procedure is then repeated to detect the anomalies of type C, D, etc. according to the above-described modes.

Table 1 shows the capability of discriminating the method with respect to various flaws, obtained from a series of welding experimental tests on electro-galvanized steel sheets with a 0.7-mm thickness. The values of the physical parameters detected as optimum for the used welding apparatus are the following ones:
power laser 1.9 kW
welding speed 1.3 metri/min shielding gas $N_2$, flow 5 lt/min
gap between the sheets 0.2 mm
spectra acquisition frequency 25 Hz
spectrometer resolution 0.6 nm The table shows some of the pairs of the wavelengths, detected based upon the above-described method, the intensities thereof are used to calculate the ratios of equations (2) and (2a). The discrimination probability shows the probability level detected by the equations (7) and (8), that is the probability that the ratio of the signals obtained by welding under optimized conditions unsuitably exceeds the discrimination threshold value (false positive) or that the ratio value of the signals obtained by welding under not optimized conditions does not exceed such threshold value, by preventing to detect the anomaly (false negative).

TABLE 1

| Parameter | Wavelengths $\lambda_q, \lambda_m$ (nm) | Probability of missed discrimination x%, see eq. 7 and 8 (%) |
|---|---|---|
| Focus −3 mm | 539.96-553.33 | 0.16 |
| | 552.78-554.45 | 0.19 |
| | 530.49-592.33 | 0.24 |
| Focus −2 mm | 591.22-614.62 | 0.13 |
| | 587.88-641.92 | 0.14 |
| | 552.78-595.68 | 0.21 |
| Focus +3 mm | 591.78-552.22 | 0.20 |
| | 552.78-594.56 | 0.37 |
| | 262.50-589.55 | 0.41 |
| Focus +5 mm | 552.78-592.33 | 0.15 |
| | 571.72-592.33 | 0.27 |
| | 588.43-642.48 | 0.31 |
| Gap 0.5 mm | 472.55-480.35 | 0.24 |
| | 528.26-532.16 | 0.43 |
| | 523.80-539.96 | 0.59 |
| Gap 0 mm | 517.68-527.70 | 2.2 |
| | 530.49-542.19 | 2.2 |
| | 535.51-541.08 | 2.6 |
| Speed 2 m/min. | 479.79-482.02 | 1.7 |
| | 472.55-479.79 | 1.8 |
| | 516.00-523.80 | 2.4 |
| Speed 0.7 m/min. | 589.55-600.69 | 6.3 |
| | 589.55-613.51 | 6.4 |
| | 589.55-622.98 | 6.6 |
| Power 1.3 kW | 273.64-611.83 | 9.3 |
| | 252.47-644.71 | 9.4 |
| | 252.47-611.83 | 9.5 |
| Shielding gas flow 3 lt min | 536.06-562.25 | 6.3 |
| | 636.91-480.35 | 6.4 |
| | 516.00-562.25 | 7.0 |
| Shielding gas flow 1 lt/min | 522.13-562.81 | 6.4 |
| | 531.60-567.26 | 7.7 |
| | 516.00-562.81 | 8.1 |

By summarizing, in the above-described method for detecting flaws in the process for the continuous laser welding of metallic portions, in order to detect in advance alterations of the process conditions which could lead to the occurrence of flaws in welding and to provide information to be used to actuate a corrective retroaction system onto the welding apparatus, a monitoring of the intensity ratios at specific pairs of wavelengths of the optical emission spectrum of the plasma generated during welding is performed; the pairs of wavelengths to be used and the threshold values for the comparisons are determined in a calibration phase in the system, consisting in the systematic analysis of the emission spectra obtained both under optimum conditions, both by varying in controlled way one or more physical parameters of the welding process.

The spectra acquired by the sensor during welding can be analyzed in real time in order to obtain information useful to control in real time the welding apparatus, for example to correct the parameters of the welding process which have deviated from the optimum values.

Furthermore, the spectra acquired by the sensor during welding are analyzed in real time, or stored and analyzed subsequent to acquisition, in order to obtain information about the quality of the result of the welding process, such as for example the type and the extension of possible occurred flaws.

Furthermore, said spectra can also be analyzed in real time, or stored and analyzed subsequent to acquisition, in order to obtain information about anomalies in the materials to be welded, such as for example alterations in the chemical composition, presence of surface contaminants.

At last, said spectra can even be analyzed in real time, or stored and analyzed subsequent to acquisition and compared with the results of the welding process in order to evaluate the variation ranges of the physical parameters which, even if they deviate from the conditions detected as optimum, provide a still acceptable welding result.

To the above-described method for detecting flaws in the process for continuous laser welding of metallic portions a person skilled in the art, in order to satisfy additional and contingent needs, could introduce several additional modifications and variants, all however within the protective scope of the present invention, as defined by the enclosed claims.

The invention claimed is:

1. A method for detecting flaws in the process for the continuous laser welding of metallic portions, wherein a spectroscopic sensor (7) measures the plasma emission spectrum (2) in a range of wavelengths comprised between $\lambda_{max}$ and $\lambda_{min}$ in N channels so that each channel measures the intensity of the radiation emitted in the band centred at wavelength $\lambda_i$ ($1 \leq i \leq N$) and with width $\Delta\lambda_i$, the spectrum acquisition taking place at regular time intervals, the detection of the deviation of the process physical parameters from optimum conditions being based upon the calculation, for each acquired spectrum, of intensity relationships of the signal measured at some specific wavelengths and in the comparison of such relationships with pre-determined threshold values, said method comprising a calibration phase wherein:

a series of K weldings is performed, under optimized conditions with respect to the process parameters, for each one thereof a number J of spectra $O_{J,K}$, is acquired, each one corresponding to a vector of N intensity values at the wavelengths $\lambda_i$, $1 \leq i \leq N$, which are stored in a processor;

a series of weldings K' is performed, wherein K' is not necessarily equal to K, wherein a single welding parameter A is altered by a known quantity, for each one of said weldings being acquired a sequence of J' spectra $A_{J',K'}$, with J' not necessarily equal to J, which are stored.

2. The method according to claim 1, wherein said parameter A is chosen from the group of parameters consisting of:

a laser emission power, with an alteration towards values higher or lower than an optimum value;

a piece translation speed, with an alteration towards values higher or lower than the optimum value;

a focus distance of the laser beam with respect to the piece surface with an alteration towards values higher or lower than the optimum value;

a separation or gap between two sheets to be welded; and an assistance gas flow.

3. The method according to claim 1, wherein for each one of the spectra acquired respectively under optimized conditions $O_{J,K}$, and not optimized conditions $A_{J',K'}$, the matrixes of ratios $RO_{J,K}(q,m)$ and $RA_{J,K}(q,m)$ are calculated according to the relation $$RO_{J,K}(q,m) = O_{J,K}(q)/O_{J,K}(m) \quad (2)$$

$$RA_{J,K}(q,m) = A_{J,K}(q)/A_{J,K}(m) \quad (2a)$$

which correspond to a ratio of intensities at wavelengths $\lambda_q$ and $\lambda_m$, to detect the pairs of indexes q and m wherein intensity ratios of the spectra between the weldings under optimized conditions and the weldings under anomalous conditions for each pair of indexes mainly differentiate and the welding under anomalous conditions for each pair of indexes q, m where $1 < q < N$ and $1 < m < N$, takes place if for all spectra of the series $O_{J,K}$ and $A_{J',K'}$ the relation $$RA_{J',K'}(q,m) > RO_{J,K}(q,m) \quad (3)$$

is verified
or if the relation $$RA_{J',K'}(q,m) < RO_{J,K}(q,m) \quad (4)$$

is verified.

4. The method according to claim 3, wherein if the relation (3) or (4) is not verified for any pair of indexes, a weaker discrimination is detected by the following statistical criterion: a search for pairs of indexes (q,m) which for all spectra and for all sequences J, K and J', K' verify the relation $$P_{100-x}(RO_{J,K}(q,m)) \leq P_x(RA_{J',K'}(q,m)) \quad (5)$$

or the relation $$P_{100-x}(RA_{J',K'}(q,m)) \leq P_x(RO_{J,K}(q,m)) \quad (6)$$

wherein $P_x$ is a percentile at a probability level x, $P_{100-x}$ is a percentile at a probability level 100-x;

for a given pair of indexes q, m the relation (5) being verified if a distribution of the values of $RO_{J,K}(q,m)$ falls for a fraction 100-x below a certain reference value, and a distribution of the values of $RA_{J',K'}(q,m)$ falls for a fraction not higher than x below such reference value;

the relation (6) being verified if for a given pair of indexes q, m the distribution of the values of $RA_{J',K'}(q,m)$ falls for a fraction 100-x below a given reference value, and the distribution of the values of $RO_{J,K}(q,m)$ falls for a fraction not higher than x below such reference value;

the value of x therefor the condition (5) or (6) being verified with the strict equality condition constituting a figure of merit for the pair of wavelengths $\lambda_q$ and $\lambda_m$, as it designates a probability of discriminating between optimum or anomalous conditions by using the intensity ratio at the wavelengths $\lambda_q$ and $\lambda_m$.

5. The method according to claim 4, wherein, for at least some of the anomalous conditions A for performing the welding:

a series of pair of wavelengths $(\lambda_q, \lambda_m)_{A,n}$ verifying the condition (5) or the condition (6), with x smaller or equal to a given level $x_{min}$; and a series of associated figures of merit (probability values) x(A,n) therefor the condition (5) or (6) is verified with the equality sign, are detected, for these pairs of wavelengths a series of higher threshold values S(A,n) is determined so that:

$$S(A,n) = P_{100-x(A,n)}(RO_{J,K}(q,m)_{(A,n)}) = P_{x(A,n)}(RA_{J',K'}(q,m)_{(A,n)}) \quad (7)$$

and a series of lower threshold values I(A,n) is determined so that:

$$I(A,n) = P_{100-x(A,n)}(RA_{J',K'}(q,m)_{(A,n)}) = P_{x(A,n)}(RO_{J,K}(q,m)_{(A,n)}) \quad (8)$$

in case for the pair of indexes (q,m)(A,n) the conditions (3) or (4) are verified, thresholds S(A,n) and I(A,n) can be defined by using respectively the relations $$S(A,n) = [\min(RA_{J',K'}(q,m)) + \max(RO_{J,K}(q,m))]/2 \quad (9)$$

$$I(A,n) = [\max(RA_{J',K'}(q,m)) + \min(RO_{J,K}(q,m))]/2 \quad (10)$$

being max and min the maximum and minimum values of respective series of ratios, in these two cases the value zero being assigned to the associated figure of merit (probability value) x(A,n).

6. The method according to claim 1, further comprising a diagnostic phase wherein the spectroscopic sensor acquires at regular time intervals the plasma emission spectrum during welding which is analysed to detect the anomaly A.

7. The method according to claim 6, wherein for the pairs of wavelengths $(\lambda_q, \lambda_m)_{A,n}$ detected in the calibration phase, the corresponding ratios $R(q,m)_n$ are calculated, each one of the so-calculated ratios is compared with the threshold I(A,n) or with the threshold S(A,n); to verify condition $$R(q,m)_n > S(A,n) \quad (11)$$

or condition $$R(q,m)_n < I(A,n) \quad (12)$$

taking place of the condition (11) or the condition (12) showing that the level of $R(q,m)_n$ has entered the range of values corresponding to a condition of anomaly A.

8. The method according to claim 7, wherein the diagnostic phase is performed for at least one of the pairs of channels $(q,m)_{A,n}$, based upon how many pairs and which pairs $(q,m)_{A,n}$, $(q',m')_{A,n'}$, $(q'',m'')_{A,n''}$ verify a condition for passing the threshold (11) or (12) being possible deciding if an anomaly has really occurred, which type among the experimented cases in the learning phase, and in case using this piece of information for corrective actions.

9. The method according to claim 8, wherein the diagnostic phase is repeated for each anomaly proved in a preceding calibration phase.

10. The method according to claim 1, wherein the plasma emission spectrum is acquired by a sensor configured to measure simultaneously an instantaneous or integrated intensity over a time range $\Delta t$, of an optical radiation in N spectral bands in a region 200-2000 nm, centred at different wavelengths $\lambda_i$, (i=1 . . . N) with bandwidths $\Delta\lambda_i$.

11. The method according to claim 10, wherein said sensor is constituted by a diffraction grating type spectrometer with array detector; by a dispersive prism type spectrometer with array detector; by a series of band-pass filters centred at different wavelengths with a radiation power measurer associated to each filter; by a sensor constituted by an array detector of CCD or CMOS type in front thereof a band pass filter is placed with transmission spectrum depending from the position; by a Fourier transform type spectrometer with beam division.

12. The method according to claim 1, wherein the spectrum to be analysed coming from the sensor is previously subjected to pre-processing procedures to calculate again or define again the number of bands, to calculate again or define again the width of the single bands, to modify the signal level in each band, to improve the signal-noise ratio, by at least one of the following: subtraction of a background spectrum; transformation of the signal intensity level of each band by means of a defined mathematical relation; interpolation at different wavelengths; re-sampling at different wavelengths; average or sum between channels with contiguous wavelengths; convolution with a spectral filter function; average, sum or convolution with a time filter function of two or more spectra acquired at different periods of time.

* * * * *